July 14, 1942.     W. S. LOESCH     2,289,582

GENERATOR CONTROL

Filed May 9, 1939

WITNESS

Robt. L. Hill

INVENTOR

William S. Loesch

Patented July 14, 1942

2,289,582

UNITED STATES PATENT OFFICE 2,289,582

GENERATOR CONTROL

William S. Loesch, Green Island, N. Y.

Application May 9, 1939, Serial No. 272,573

1 Claim. (Cl. 171—314)

My invention relates particularly to improvements in the control of generating systems comprising a generator coupled to a storage battery and a varied load circuit receiving energy from such a system.

This present invention is an improvement on the invention that is described and claimed in a former application, Serial No. 252,765, filed January 25, 1939. In that application there is disclosed a battery charging system that is regulated with wide latitude over a varied range of changing conditions both internal and external to the system. The present specifications and illustrations will include all specifications and illustrations of the former application pertinent to the present invention.

In general, my invention is designed to so control a generating system of the classification described that the generator may deliver maximum current to the battery when the battery is in that state of fractional discharge that such a maximum current is desirable and safe. It is further intended to obtain the maximum output from the generator, when such is desirable, directly in proportion to the efficiency of the generator with respect to the temperature of the cooling air available to circulate about and cool the armature and field coils and, also, to allow the practical utilization of the generator's short period overload capacity when it is at such a temperature that an overload, of controlled duration, may be safely carried. Another object of the co-operating elements of my invention is to permit the voltage controller to begin to function at any predetermined potential peak of the system irrespective of the specific potential at which the automatic switch causes the generator to be closed into the battery circuit. This last, is accomplished by means of an automatic switch, or cutout, so arranged that the voltage regulating unit is inoperative until the switch has functioned to close the generator into the battery circuit.

The advantages obtained by incorporating the combined functions into the automatic switch as described, will be better understood by first giving consideration to the general characteristics of a battery charging system and the subsequent controlling means.

With the usual type of controller, the voltage of the system must mount to a peak that is slightly above that of the point at which the automatic switch connects the generator to the battery. For example, the generator may be cut into the battery circuit at seven volts and the voltage regulator may begin regulation at seven and one half volts. Under such conditions, the voltage of the system must mount to very nearly maximum before voltage regulation can begin or, in other words, the potential must mount to a peak closely approaching that of maximum before regulation can begin, and then it makes a sharp drop as the controller starts its vibratory regulation.

Controllers of a similar type to my invention, heretofore used, had to function between narrow limits and were rendered inflexible and subject to cause a sharp initial drop in potential at the beginning of each regulating cycle with a consequence that troublesome and, sometimes, harmful conditions existed in the load circuit of systems so controlled. Such conditions were accepted as unavoidable, however, because greater complexities would result if the regulator were so adjusted that, at any time, it could begin its vibratory action before the automatic switch had connected the battery into the circuit.

In order to circumvent the disadvantages peculiar to these circuits, the cutout described and illustrated in this application is so arranged that it renders the regulator inoperative until it has actuated to close the generator into the battery circuit. An arrangement of this nature allows for greater latitude of regulation by making it possible to have regulation begin at any predetermined potential peak above battery voltage without regard for that potential peak at which the cutout operates to connect the generator to the battery. This arrangement allows, also, the use of a less precisely set and, consequently, cheaper cutout assembly than would otherwise be practicable.

The conventional battery charging system as used, for example, in automotive vehicles must be designed to operate satisfactorily through a range of temperature changes of extremities of substantially one hundred degrees Fahrenheit. With predominating low temperatures due to seasonal change, more energy is used in the load circuits of vehicular systems as well as in the internal circuit of the system especially with regard to the losses of the storage battery. Such conditions due to changes in atmospheric temperature as well as seasonal conditions that demand heavier load circuit currents are greatly compensated for by the fact that generator efficiency increases inversely with decreasing ambient temperatures. In order to take advantage of this circumstance relative to generator efficiency and increase the latitude of control, the controllers herewith described and illustrated are provided with means for regulating the total current output of the generator directly in proportion to ambient temperatures and, consequently, directly in proportion to the efficiency of the generator windings since the efficiency of these windings also varies proportionately with changes in temperature. It should be understood, however, that at such times that a maximum current output of the generator would be undesirable or harmful to the battery, that the voltage regulator would function to reduce the output, as well as the voltage, to a safe value.

Additional regulating means for obtaining maximum generator output, actually an overload in this instance, is provided in these controllers in the form of a contactor sensitive to generator heat that operates to permit a comparatively low resistance circuit for the field current of the generator when the temperature of the generator is substantially below that at which it operates when carrying its normal safe load.

The voltage controlling unit of my system is rendered incapable of producing its vibratory regulating action until the automatic cutout switch has actuated to close the generator into the battery circuit as previously described. By this means the vibratory action of the controller, with the accompanying fluctuating potential of the generator circuit, cannot take place before the cutout closes. Since both the automatic cutout switch and the voltage regulator of the conventional controller, as well as in the circuits here described, are of electromagnetic construction and are energized to produce their initial action by means of shunt coils that are sensitive to generator potential, if the voltage regulator could begin its regulating cycle before the cutout had made contact, the fluctuating potential of the circuit resulting from regulator action would cause a corresponding fluctuation of energy in the shunt coil of the cutout and result in an objectionable vibratory action of the cutout contacts when closing. The regulator of the preferred circuit here described employs what is commonly known as demagnetizing coils to prevent the regulator armature from locking down during any regulating cycle and thereby permitting objectionably high potential to be impressed upon the load circuit of the system. However, in this invention, the regulator demagnetizing coils perform a dual function since they are energized initially until the cutout has operated to close the generator into the battery circuit and, hence, by being so circuited, these coils prevent a premature functioning of the regulator. Further flexibility of voltage control is provided for by means of supplementary control of the action of the voltage regulator in relation to atmospheric temperatures to compensate for the varying efficiencies of the voltage regulator shunt coil with changing temperature conditions.

With these and other objects in view, my invention includes the novel construction and the arrangement of elements described below and illustrated in the accompanying drawing in which.

Figure 1:
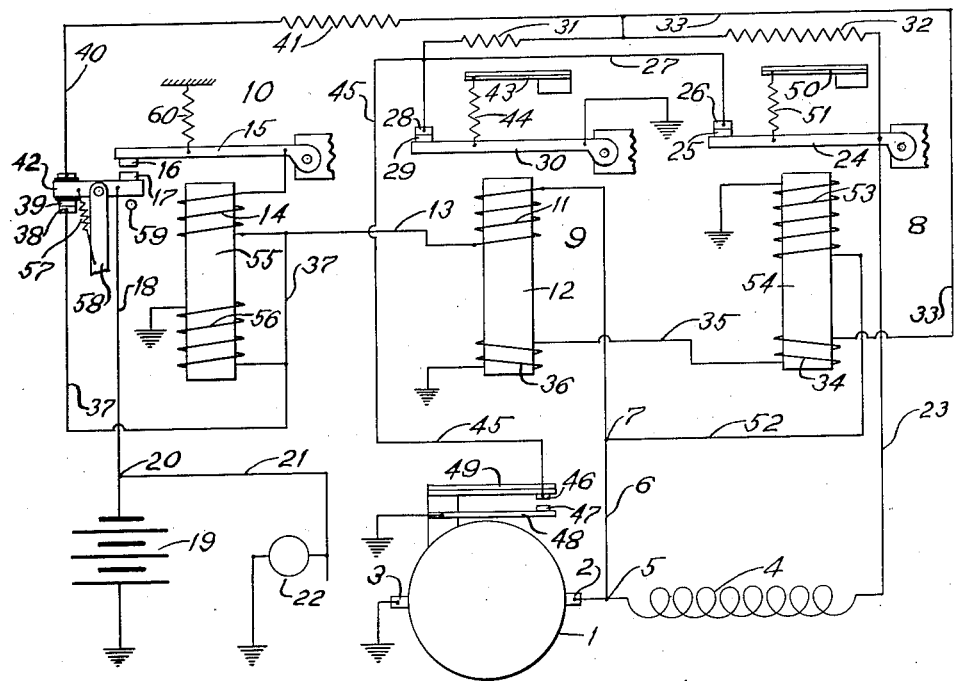
Fig. 1 is a schematic wiring diagram illustrating the preferred circuit of my invention.

Referring first to the schematic diagram of Fig. 1, it should be noted that the circuit is essentially comprised of five main elements. These elements are the generator 1, the battery 19, and a three stage regulating unit the latter of which consists of the three elementary units illustrated generally as the cutout switch at 10, the current regulator at 9, and the voltage regulator at 8.

For the purpose of describing the circuit of Fig. 1, I will describe individually the five elementary units thereof as above indicated in order to set forth a preferred construction for each unit, with the exception of the battery 19 which may be considered as being the standard type of storage battery as being applicable to such circuits as, for example, the standard type used in motor vehicles.

The cutout switch indicated generally at 10 consists of a core 55 of magnetic material upon which is wound a voltage coil 56 that is shunted across the circuit and, hence, sensitive to the potential of the circuit. A second coil 14 is also wound on the core 55 and is in series with the circuit and, when the generator is charging the battery, is a conductor of the charging current to the battery. When the coil 56 is sufficiently energized by the generator, it will result in a flux circuit in the core 55 of sufficient strength to attract the pivotally supported armature 15 by overcoming the biasing force of the spring 60 and cause the engagement of the contacts 16 and 17 and the disengagement of the contacts 38 and 39 through the pivoting action of the rocker 42 against the slight biasing action of the spring 57. The pivoting action of the rocker 42 is limited by the stop 59 and said rocker is shown with suitable support at 58. With the closing of the contacts 16 and 17, charging current from the generator is delivered to the battery through conductor 6 connected to the main brush 2 of the generator 1, through current regulator series coil 11, conductor 13, cutout series coil 14, armature 15, contacts 16 and 17, rocker 42, and thence to the battery through conductor 18. Before the cutout closes the generator into the battery circuit, the contacts 38 and 39 are held closed by means of the light biasing spring 57 and, by this arrangement, the demagnetizing coils of the regulators are energized until the generator is closed into the battery circuit by the action of the cutout. It should be noted that contact 39 is electrically insulated from the rocker arm 42 and, hence, also from the contact 17 and the battery connecting lead 18.

The current regulator indicated generally at 9 consists of a core 12 of magnetic material upon which is wound the current coil 11 in series with the generator and carrying the main or charging current of the generator. This coil is connected to the generator main brush 2 at 5 through conductor 6 and the other end of the coil is connected to the series coil of the cutout through conductor 13. A second coil 36 is wound on the core 12 in the opposite direction to that of the coil 11 and functions as, what is commonly known as, a demagnetizing coil during the vibratory operation of the current regulator. A pivotally supported armature 30 carries the contact 29 which is biased into abutment with the contact 28 by the spring 44. The tension of the biasing spring 44 is varied by the action of a suitable supporting means 43 in relation to changes in ambient temperature. A warpable thermal sensitive element, such as a bimetallic strip, may be used for the support 43.

The voltage regulator in the circuit of Fig. 1 is indicated in general at 8. This regulating unit consists of a core 54 of magnetic material upon which is wound a coil 53 and a second coil 34 wound in the opposite direction to that of the coil 53. Such a coil as that of 34 is commonly known as a demagnetizing coil. The main coil 53 of the regulator 8 is shunted across the generator main circuit and is therefore sensitive to generator potential. An armature 24, pivoted from a suitable support at one end, is part of the magnetic circuit of the core 54. Electrically integral with the armature 24 is one contact 25, that during the non-operative period of the regulator unit 8, is held biased into cooperative abutment with the contact 26 by the tension spring 51. The tension of the spring 51 is varied in proportion to changes in atmospheric temperature in order to compensate for the varying efficiency of the voltage coil 53 with change of temperature.

The generator indicated by 1 of Fig. 1 is of the two brush type with brushes indicated at 2 and 3 respectively. It should be understood, however, that the three brush type of generator could be used in the described circuit and the only necessary change would be in connecting the field coil 4 to the third brush of such a generator while in the described circuit it is connected as at 5. The generator 1, as shown, has one of the main brushes 3 grounded and to the remaining brush 2 is connected the main circuit conductor 6 and the field coil 4. The field coil 4 is so circuited that, with the generator charging and with no vibratory regulation taking place, it completes its circuit through the conductor 23, armature 24, contacts 25 and 26, conductor 27, contacts 28 and 29, and through armature 30 to ground. A thermal sensitive contactor is mounted in close cooperating relationship to the generator 1 and is sensitive to generator heat. This contactor is schematically represented in Fig. 1 with the thermal sensitive blade at 49, contacts at 46 and 47, and a resilient contact carrying member at 48. The thermal blade of the contactor causes the contacts 46 and 47 to close when the temperature of the generator is at a predetermined low point. With contacts 46 and 47 closed, the current regulator indicated generally at 9 is rendered ineffective since the resistor 31, that during the regulating cycle of the regulator 9 is inserted intermittently in series with the field coil 4, is shorted out and the field current completes its circuit to ground through conductor 45, contacts 46 and 47, and the resilient contact carrying member 48. The use of this thermal contactor permits a controlled generator overload when the temperature of the generator is sufficiently low that such an overload may be carried with safety.

The cooperative functioning of the above described elementary units of my controlling device is briefly as follows. When the generator 1 initially starts and produces a voltage across the brushes 2 and 3, exciting current is delivered to the field coil 4, connected at 5 to brush 2 and the field coil completes its circuit through conductor 23, armature 24, contacts 25 and 26, conductor 27, contacts 28 and 29, and to ground through armature 30. Exciting current is also delivered to the parallel shunt coils 56, of the cutout 10, and 53 of the voltage regulator 8. The circuit for the cutout shunt coil is from generator brush 2, connection 5, conductor 6, series coil 11, conductors 13 and 37, and through the coil 56 to ground. The circuit for the voltage regulator shunt coil 53 is from generator brush 2, connection 5, conductor 6, connection 7, conductor 52, and through the coil 53 to ground.

As generator voltage increases so, also, increases the magnetic flux in the cores 55 and 54 of the cutout and voltage regulator respectively. In order to prevent the magnetic flux of the voltage regulator core 54 from increasing sufficiently that the armature 24 will be caused to start its vibratory regulating action before the cutout has closed the generator to the battery circuit, my system is so arranged that the demagnetizing coils 34 and 36 are initially energized at the beginning of each charging cycle of the generator before the cutout operates to close the contacts 16 and 17. Hence, especially by energizing the coil 34 that is so wound that its ampere turns oppose those of the coil 53, the total flux strength of the regulator circuit 8 must always be substantially weaker than that of the cutout circuit 10 prior to the closing of the cutout contacts 16 and 17. The energizing circuit of the demagnetizing coils 34 and 36, prior to cutout action, is as follows: generator brush 2, connection 5, conductor 6, coil 11, conductors 13 and 37, contacts 38 and 39, conductor 40, resistor 41, conductor 33, through series demagnetizing coil 34, conductor 35, series demagnetizing coil 36, and the return circuit to the generator being completed through the ground connections.

With mounting generator potential, the shunt coil 56 of the cutout 10 will eventually produce a magnetic flux circuit of sufficient strength to attract the armature 15 and, thereby, simultaneously close the contacts 16 and 17 and open the contacts 38 and 39, through the pivoting action of the contact carrying rocker 42, the distance through which the armature 15 may be so motivated being limited by the stop 59. With the closing of the contacts 16 and 17, a closed circuit results between the generator and the battery as follows: generator brush 2, connection 5, conductor 6, coil 11, conductor 13, coil 14, armature 15, contacts 16 and 17, rocker 42, and conductor 18 to battery with the return circuit being completed through the ground connections of both the generator and the battery.

Control of generator load is maintained through the action of the regulating unit indicated generally at 9. The load current of the generator is carried by the series coil of this unit that is wound upon the core 12. When the current in the coil 11 results in a flux circuit of predetermined strength, the pivotally supported armature is attracted and causes the opening of the contacts 28 and 29 which results in a higher resistant field circuit of the generator as follows: from generator brush 2, connection 5, field coil 4, conductor 23, and the current paralleling through resistor 32, and by way of armature 24, contacts 25 and 26, conductor 27, also through resistor 31, thence through conductor 33, demagnetizing coil 34, conductor 35, and through demagnetizing coil 36 to ground. This higher resistant field circuit results in decreased field excitation and, subsequently also, in a decrease of the generator load current to the battery. The decreased load current, due to lowered field excitation, results in a weakening of the flux circuit in the core 12 of the regulator unit 9 caused by the decreased current in the series coil 11 and also by the demagnetizing effect of the coil 36. The weakened flux of the core 12 permits the biasing spring 44 to return the armature 30 to its former position closing the contacts 28 and 29. The field coil 4 now has its former, and comparatively low resistant, circuit and may, under the same load conditions, repeat the same cycle of alternative circuiting until the load current is decreased or the generator is stopped. In actual practice, the alternative circuiting with the accompanying make and break contacting is caused to repeat at a very rapid rate whenever the load value exceeds a safe maximum.

In order to compensate for the varying efficiency of the generator windings under changing temperature conditions, the tension of the armature biasing spring 44, in my controller, is varied proportionately to changing atmospheric temperatures by means of the thermal sensitive supporting blade 43. A further means of obtaining a maximum load value from the generator under favorable conditions is provided in the form of a thermostatic contacting device that is sensitive to generator heat. When the temperature of the generator is comparatively low, as would be the case with a vehicle generator that is being started on a cold day, it can safely carry a relatively heavy current load for a short duration of time until its operating temperature approaches normal. I derive this desirable result by shorting out the resistor 31 of the current regulator 9 when the temperature of the generator is such that it may carry a heavy load current without sustaining injury. When the temperature of the generator is at some particular low point, the contacts 46 and 47 are caused to close by the warping action of the bimetallic element 49 and, hence, with these contacts closed, the field coil 4 can complete its circuit through conductor 45, contacts 46 and 47, and resilient member 48 to ground. By arranging the grounding of the field through the circuit described, the operation of the regulator 9 is rendered ineffective when the contacts 46 and 47 are closed. It should be noted, however, that the cooperative functioning of any of the elements of the regulating unit 9, would not interfere with the controlling action of the voltage regulator 8 in regulating the potential value of the system if this should mount too high.

In general, the voltage regulator 8 operates to cut down the charging rate of the generator 1 to the battery 19 as battery voltage, and the voltage of the load circuit, reaches a predetermined high point. A load, receiving energy from the system, is indicated at 22 of Fig. 1. The load 22 may represent any of the individual electrical devices that are usually found in the battery charging systems of automotive vehicles. The unit 8 is of similar construction to that of the current regulating unit 9, the action of which has been just described. Upon the core 54 is wound a coil 53 that is shunted across the generator main circuit and, hence, is sensitive to the voltage of the circuit. A second coil 34 is wound on the core 54 also, but, the direction of the winding of this coil is such as to cause it to oppose the field of the first coil 53, hence, in regulator circuits, the coil 34 is broadly termed as a demagnetizing coil. In operation, with the generator starting and building up its initial E. M. F., the field strength of the coil 53 builds up in proportion to the mounting generator potential since this coil is shunted across the generator circuit and is connected as follows: generator brush 2, connection 5, conductor 6, connection 7, conductor 52, and coil 53, with the circuit being completed through the ground. It should be noted here that the coil 56 of the cutout is also a shunt coil, the circuit of which has been previously described, and, hence, this coil produces a field of a strength proportionate to circuit potential in exactly the same manner as does that of the coil 53. As has been previously set down, one of the objects of my invention is to permit regulation to begin at any desired potential peak of the system without regard to that particular point at which the cutout connects the generator to the battery. In order to facilitate this condition in this present controller, I have so circuited my system that, prior to the instant that the cutout acts to connect the generator to the battery, the total flux produced in the core 54 is less than the proportionate field strength of the coil 53. In short, the flux produced in the core 54 of the regulator unit 8, prior to the closing of the cutout contacts 16 and 17, is proportionately less at any given potential peak than the flux produced in the cutout core 55. This result is due to the demagnetizing effect of the coil 34 which is energized until the cutout closes the contacts 16 and 17 with the subsequent opening of the contacts 38 and 39 which permits the normal operation of the regulator 8. Before the cutout causes the closing of the contacts 16 and 17 and the opening of the contacts 38 and 39, the series demagnetizing coil 34, as well as the demagnetizing coil 36, is circuited as follows: generator brush 2, connection 5, conductor 6, series coil 11, conductors 13 and 37, contacts 38 and 39, conductor 40, resistor 41, conductor 33, series demagnetizing coil 34, conductor 35, and through series demagnetizing coil 36 with the return circuit through ground connection.

From the foregoing it will be understood that the regulator 8 cannot begin its vibratory regulating action until after the cutout has connected the generator to the battery and instantly, thereafter, regulation may begin at any desired voltage of the system. For example, in a six volt vehicular system, the tension of the cutout spring 60 might be of sufficient tension to prevent the armature 15 from being attracted towards the core 55 until the voltage impressed upon the shunt coil 56 has mounted to seven and one half volts. During this interval, however, the magnetic attraction of the regulator core 54 for the armature 24 cannot overcome the tension of the spring 51 and cause the opening of the contacts 25 and 26 due to the flux diminishing effect produced by the coil 34. But, with the closing of the cutout contacts 16 and 17 and the opening of the circuit of the demagnetizing coil 34, voltage regulation may immediately begin and, if desirable, at a potential peak even lower than that at which the cutout operated to close the generator into circuit or, for example, the voltage regulator may begin its vibratory regulating action at seven volts.

When the potential of the system is sufficiently high that the armature 24 of the voltage regulator 8 is attracted and, thereby, breaks the electrical circuit at the contacts 26 and 27, the generator field coil 4 is circuited through conductor 23, resistor 32, conductor 33, series demagnetizing coil 34, conductor 35, and through series demagnetizing coil 36 to ground. The comparatively high resistance of this circuit for the field coil current, causes a sharp drop in field excitation with a subsequent drop in the potential across the generator brushes. The potential drop at the brushes of the generator coupled with the demagnetizing effect produced by the coil 34 when the regulator contacts 25 and 26 are open, results in a decreased field strength of the shunt coil 53 so that the biasing spring 51 causes the pivotally supported armature 24 to move away from the core 54 and close the contacts 25 and 26. This recircuiting cycle of the regulator is repeated very rapidly and continues indefinitely until the potential of the system drops.

It may be noted here that the functioning of the demagnetizing coils 34 and 36 of the regulating units 8 and 9 respectively, but particularly the coil 34 of the regulator 8, are included as part of my controller principally for the protection of the load circuit of the system. If the demagnetizing coils were not part of these circuits, it would result in the locking down of the armature 24 of the voltage regulator 8 at a point where the potential had mounted to an extreme. This condition would cause a greatly reduced output of the generator but the potential of the system would be reduced only at the first instant that the resistor 32 were placed in series with the field coil 4. Under such a condition, as exemplified, it is apparent that the load circuit would have an objectionably high potential impressed upon it.

Greater flexibility of voltage control is made possible by the use of the heat responsive element 50 to regulate the tension of the spring 51 in response to changes in atmospheric temperature. By this means, compensation for the changing efficiency of the coil 53, with varying temperatures, is attained.

Figures 2, 3:
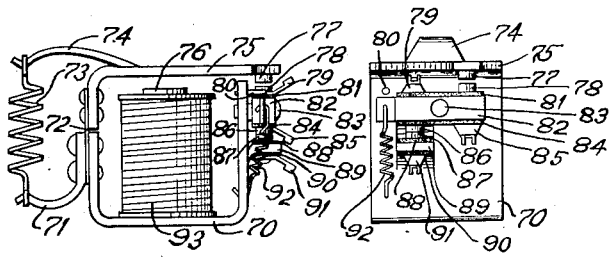
Fig. 2 is a front elevation view of a preferred form of automatic cutout switch as applicable to my invention and illustrated in the schematic diagram of Fig. 1.
Fig. 3 is a side elevation of the cutout illustrated in Fig. 2.

A cutout of the general mechanical features illustrated schematically at 10 of Fig. 1 is illustrated in Figs. 2 and 3. This mechanism consists of the U shaped frame 70 to which is hinged the armature 75 by means of the resilient strap 72. Means for mechanically opening the switch is provided in the spring 73 which is attached between the extension brackets 71 and 74. The bracket 74 is an integral part of the armature 75. The shunt and series coils are indicated generally at 93 with the core of magnetic material at 76. The contacts 77 and 78 of this cutout construction would operate the same in circuit as those shown diagrammatically in Fig. 1 at 16 and 17 respectively and, also, the contacts 86 and 87 of Figs. 2 and 3 would be circuited as indicated in Fig. 1 by the contacts 39 and 38 respectively. A rocking contact carrier 82, which carries the contacts 78 and 86, is pivotally supported by the pin 83. The contacts 78 and 86 and their respective terminal connections 85 and 79 are insulated from the rocker 82 by the insulating pieces 81 and 84 and, also, by suitable insulation sleeves within the body of the rocker 82. The contact 77 is electrically integral with the forward end of the hinged armature 75 and is aligned to engage with the contact 81 when not held spaced apart by the mechanical force of the spring 73. The punched out support 89 carries the contact 87 and is mechanically held in electrical connection with the contact 86. The contact 87 and its terminal connection 91 is insulated from the support member 89 by insulating pieces 88 and 90 as well as a suitable insulating sleeve within the body of the support member 89. Mechanical engagement between the contacts 86 and 87 is attained by the pivoting action of the contact carrying rocker 82 and the biasing tension of the spring 92.

In actual service the cutout illustrated in Figs. 2 and 3 causes the contacts 86 and 87 to be held in engagement, and closing that branch of the circuit of which they are a part, at such times as the contacts 77 and 78 are held in spaced relationship or, more particularly, when the generator is not connected to the battery. With the closing of the contacts 77 and 78, which closes the generator into the battery circuit, the resultant rocking motion of the support member 82 causes a simultaneous opening of the contacts 86 and 87 and that part of the circuit with which they are associated. The distance that the contacts 86 and 87 may be moved apart by the rocking motion of the support member 82 is limited by the stop 80.

Figure 4:
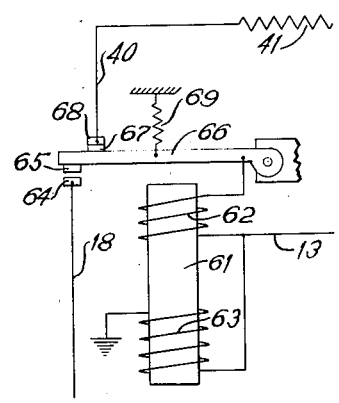
Fig. 4 is a schematic diagram of an alternative type of cutout switch that may be applicable to my invention.

An alternative type of cutout that may be used in the circuits that have been described is shown diagrammatically in Fig. 4. This cutout has a core 61 of magnetic material upon which is wound the series coil 62 and the shunt coil 63. The pivotally supported armature 66 is held biased by the tension spring 69. In the cutout illustrated in 10 of Fig. 1 a rocking contact carrying structure is employed with the circuit breaking means of the second set of contacts being contrived through the pivoting motion of the rocking mechanism. In the cutout of Fig. 4, however, two contacts are mounted integrally upon the armature 66 and each of these is in cooperative alignment with a second contact. One pair of contacts 67 and 68 are held electrically connected by the tension spring 69 when the magnetic field of the cutout is not sufficiently strong to attract the armature 66. Under the same conditions that permit the first pair of contacts to remain in closed circuited relationship a second pair of contacts 64 and 65 are held spaced apart. When the magnetic attraction of the core 61 is of such a strength that it can overcome the tension of the spring 69 and, by pivoting the armature 66 toward the core, open the contacts 67 and 68, the same action closes the contacts 64 and 65. It may be seen that when the conditions governing cutout action cause one pair of contacts to close, the other pair of contacts is caused to open.

The type of cutout circuit shown in Fig. 4 is designed to contribute substantially the same characteristics to the system as does cutout 10 of Fig. 1, when substituted in the circuit of Fig. 1 for the cutout 10, and is shown in Fig. 4 as connected to the proper leads of the circuit of Fig. 1. The contact 68 of Fig. 4 is connected to the conductor 40 with part of the resistor 41 also being shown. Contact 64 is connected to the lead 18, to battery, while series coil 62 and shunt coil 63 are connected to conductor 13.

Figures 5, 6:
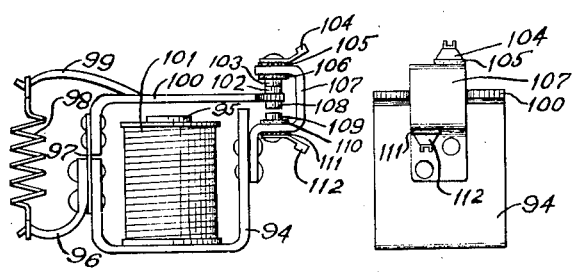
Fig. 5 is a front elevation view of the type of cutout switch illustrated schematically in Fig. 4.
Fig. 6 is a side elevation of the cutout illustrated in Fig. 5.

A cutout structure as shown diagrammatically in Fig. 4 is illustrated in Figs. 5 and 6. This construction consists of a U shaped frame 94 to which is hinged the L shaped armature 100 by means of the resilient member 97. This series and shunt coils are indicated generally at 101 and the core of magnetic material at 95. The armature 100 carries two contacts 102 and 108 that may be noted to be on the same center, but on opposite faces of the armature, in the front elevation of Fig. 5. In the side elevation of Fig. 6, however, the contacts of each cooperating pair should be assumed to be in staggered relationship to the other pair as indicated by the associated terminal connections 104 and 112 respectively. Carried by the support member 107 are contacts 103 and 109 with their respective terminal connections 104 and 112. The contacts are insulated from the support member 107 by the insulation washers 105, 106, 110, and 111 and also by suitable insulating sleeves within the body of the supporting bracket 107. Contacts 102 and 103 are held in electrical contact by the armature biasing spring 98 which is supported between the brackets 96 and 99. The bracket 99 is an extended part of the armature 100. It may be seen from the illustration of Fig. 5 that, when the contacts 102 and 103 are electrically connected, the contacts 108 and 109 are held spaced apart. Conversely, when the armature 100 is magnetically attracted toward the core 95 closing contacts 108 and 109, it must necessarily result in separating contacts 102 and 103. Pairs of contacts 102 and 103 and 108 and 109 of Fig. 5 might be circuited as indicated in the diagrammatical illustration of Fig. 4 by the pairs of contacts 67 and 68 and 64 and 65 respectively.

In the foregoing description of the preferred embodiment of my invention my terms have been those of illustration rather than limitation. Consequently, changes within the proviso of the appended claim may be made without departure from the broader scope and spirit of my invention.

What I claim is:

In a battery charging system comprising a generator and a battery, a generator controller including an electrically operable switch for connecting said generator to said battery, said switch including a coil connected across said generator and a coil in series with said generator, a current regulator for regulating the output of said generator, said current regulator comprising an operating coil connected in series with said generator, a pair of cooperating contacts operable by said coil of said current regulator, a resistance element connected across said cooperating contacts of said current regulator, said cooperating contacts and resistance element of said current regulator being connected into the field circuit of said generator with said cooperating contacts being adapted to intermittently short circuit said resistance element in accordance with the proportionate current flow in said operating coil of said current regulator, a combination of two thermal sensitive elements for controlling the regulating action of said current regulator, the first of said thermal sensitive elements being adapted to vary the degree of current limiting regulation of said current regulator in proportion to variations in atmospheric temperature and the second of said thermal sensitive elements being in heat responsive relationship to said generator and so constructed and arranged as to short out part of the effective current retarding value of said current regulator resistance element with said short circuiting action of said second thermal sensitive element being adapted to occur at a predetermined temperature of said generator.

WILLIAM S. LOESCH.